UNITED STATES PATENT OFFICE.

SAMUEL B. JOHNSTON AND SAMUEL HUNTER, OF COON RAPIDS, IOWA.

COMPOUND FOR COATING METALLIC ROOFING.

SPECIFICATION forming part of Letters Patent No. 314,584, dated March 31, 1885.

Application filed August 27, 1884. (No specimens.)

*To all whom it may concern:*

Be it known that we, SAMUEL B. JOHNSTON and SAMUEL HUNTER, citizens of the United States, residing at Coon Rapids, in the county of Carroll and State of Iowa, have invented certain new and useful Improvements in Compounds for Coating Metallic Roofing, of which the following is a specification, to wit:

This invention relates to compounds for coating metallic roofing; and it consists in a fire-proof composition formed of the ingredients and in substantially the proportions hereinafter set forth and claimed.

In order to enable others skilled in the art to which our invention appertains, we will now proceed to describe the manner of compounding and using it.

The object of our invention being to provide a coating for application to roofing somewhat similar to paint, we thoroughly mix the following ingredients in about the proportions named, viz: coal-tar, fifty gallons; chloride of sodium, eight pounds; asbestus, nine pounds; sugar of lead, two pounds; litharge, six pounds; yellow wax, six pounds; mineral paint, twenty-four pounds. These are thoroughly mixed together and applied to tin or other metallic roofing in the same manner as paint, and when dry forms a complete protection against fire or damp, prevents all rust of the metal, and is a lasting protection, which will not crack with the effects of heat or cold.

In making the article, the tar is placed over a slow fire in an iron kettle, and heated to about 225° Fahrenheit, and the asbestus is then added. When this is thoroughly dissolved, add the yellow wax, and after being well mixed add the other ingredients. It is applied with a heavy brush while quite hot, preferably not less than 200°.

Having thus fully described our invention, what we claim as new, and desire to secure by Letters Patent, is—

The within-described protective coating for metallic roofing, consisting of coal-tar, chloride of sodium, asbestus, sugar of lead, litharge, yellow wax, and mineral paint, combined in about the proportions and substantially the manner herein specified.

In testimony whereof we affix our signatures in presence of two witnesses.

SAMUEL B. JOHNSTON.
SAMUEL HUNTER.

Witnesses:
T. C. REID,
L. W. MORGAN.